Nov. 15, 1927.
C. RIEDEMAN
1,649,419
BEDPAN AND PAD
Filed May 31, 1927
Fig. 1.
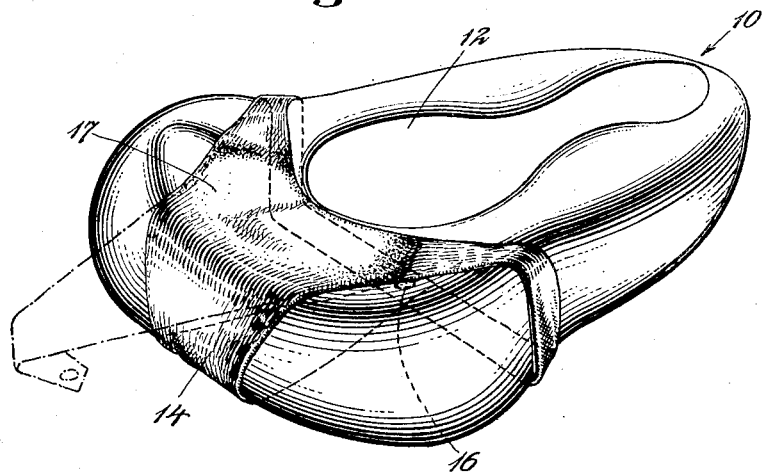
Fig. 2.
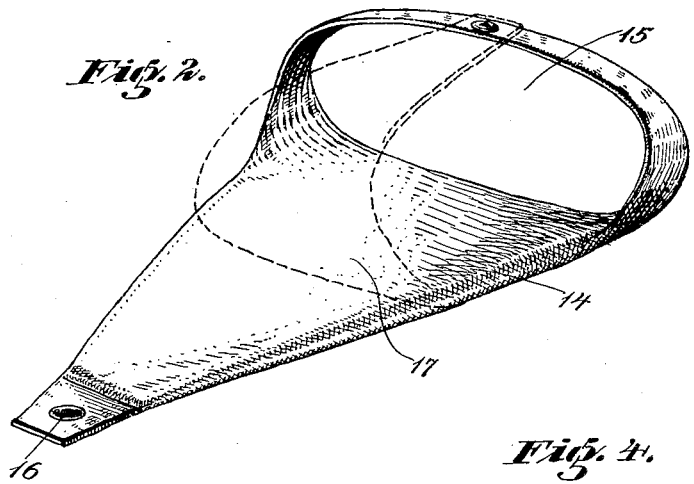
Fig. 4.
Fig. 3.
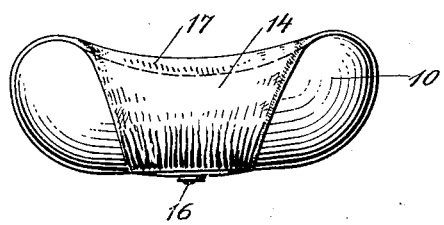
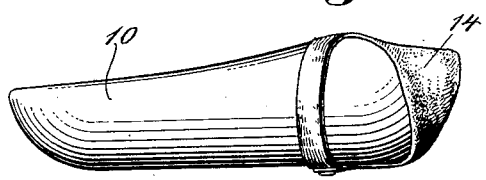
INVENTOR.
Christine Riedeman
BY
Townsend, Loftus & Hett
ATTORNEYS.

Patented Nov. 15, 1927.

1,649,419

UNITED STATES PATENT OFFICE.

CHRISTINE RIEDEMAN, OF OAKLAND, CALIFORNIA.

BEDPAN AND PAD.

Application filed May 31, 1927. Serial No. 195,214.

This invention relates to bed pans.

It is the principal object of the present invention to provide a generally improved bed pan of a form comfortable to the patient and having a pad adapted to eliminate disagreeable contact of the pan with the patient.

In carrying out the invention into practice I provide a pan substantially pear shaped in plan and curved or concaved to conform with the body of the patient. A cushioned pad is provided which overlies the portion of the pan upon which the patient bears to prevent any disagreeable contact with the pan. This pad is of a novel construction and it may be easily and quickly removed from the pan when desired.

One form which the invention may assume is exemplified in the following description and illustrated by way of example in the accompanying drawings, in which:

Fig. 1 is a perspective view of my improved combined bed pan and pad.

Fig. 2 is a perspective view of the pad.

Fig. 3 is an end view of the pan with the pad mounted thereon.

Fig. 4 is a side elevation of the pan with the pad mounted thereon.

Referring more particularly to the accompanying drawings, 10 indicates a bed pan constructed of any suitable material. This bed pan is substantially pear shaped in plan and is comparatively shallow. The top of the pan is concaved in a manner that it will fit the form of a patient resting thereon. This top is formed with an opening 12 communicating with the interior of the pan. It will be noticed from the drawings that the greater portion of the concaved top of the pan is interposed between the opening 12 and the larger end of the pan, as this is the portion upon which the patient bears. The junction between the top and sides of the pan are softly rounded as disclosed in the drawings so that no sharp corners or edges will be exposed.

To prevent physical contact between the pan and the patient, I provide a pad 14 which is of a substantially triangular pattern as shown in Fig. 2. At its larger end this pad is formed with a loop portion 15 extending at right angles to the surface of the pad. This loop 15 is of a diameter agreeing with that of the pan at a point intermediate the narrow and enlarged portions of the pan so that the loop 15 will tightly embrace the pan. As the narrow portion of the pan tapers toward one end this loop may be slipped over this end and drawn on the pan toward the larger end of the pan. As this larger end is of a greater dimension than the loop, the loop will tightly embrace the bulging portion of the pan.

The pad 14 is of sufficient length to permit its small end to be passed around the end of the pan and beneath the same to a point where it will intersect the loop 15. A snap fastener connection 16 is provided to connect this end of the pad with the loop. As the loop 15 embraces the pan transversely and the pad passes longitudinally around the end of the pan and engages the loop, the pad will be securely held on the pan.

For the comfort of the patient, the pad is provided with a pneumatic portion 17. This portion, however, may be padded with soft yielding material if desired. I prefer, however, that it be pneumatic.

In placing the pad on the pan, the end thereof is disconnected from the loop and the loop is drawn over the smaller end of the pan until it tightly embraces the larger end of the pan. The end of the pad is then passed around the end of the pan and connected with the loop 15. This prevents the loop from moving toward the smaller end of the pan and thereby holds the pad tightly in place on the pan.

From the foregoing it is obvious that I have provided an improved bed pan which will be comfortable to the patient and which is provided with an improved form of pad of simple and inexpensive construction and design to prevent any disagreeable contact of the pan with the patient.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. In combination, a bed pan tapering from one end to the other, a pad for a portion of the top of the bed pan at the larger end thereof, said pad having a loop at one end of a circumference less than the perimeter of the larger end of the pan whereby it may be arranged transversely on the pan to embrace the same to dispose the pad in proper position on the top of the pan, said pad being of sufficient length whereby it may be extended around the larger end of the pan and beneath the pan and be connected with said loop at the bottom of the pan.

2. In combination, a bed pan substantially pear shaped in plan having a rest portion adjacent its larger end upon which the patient may bear, a pad for said portion, said pad having a loop through which the smaller end of the pan may be inserted, said loop being of a circumference less than the larger end of the pan whereby it will tightly embrace the same to dispose the pad in proper position, said pad being of sufficient length whereby it may be folded around the larger end of the pan and along the bottom of the pan to a point where it intersects said loop at the bottom of the pan so that it will be attached to said loop.

3. In combination, a bed pan substantially pear shaped in plan having a rest portion adjacent its larger end upon which the patient may bear, a pad for said portion, said pad having a loop through which the smaller end of the pan may be inserted, said loop being of a circumference less than the larger end of the pan whereby it will tightly embrace the same to dispose the pad in proper position, said pad being of sufficient length whereby it may be folded around the larger end of the pan and along the bottom of the pan to a point where it intersects said loop at the bottom of the pan so that it may be attached to said loop, and cooperating fastener means on said end of the pad and said loop whereby they may be detachably connected.

4. In combination, a bed pan substantially pear shaped in plan having a concaved top portion adjacent its larger end upon which the patient may rest, a pad for said concaved top portion, said pad being substantially triangular and having a loop at its larger end through which the smaller end of the pan may be inserted, the circumference of said loop being less than the perimeter of the larger end of the pan whereby it will tightly engage the sides of the pan and support the pad in proper position, the other end of said pad extending sufficiently from the loop so that it may be led around the larger end of the pan and along the bottom of the pan to a point where it intersects with the loop at the bottom of the pan, and means for attaching said end of the pad to the loop.

CHRISTINE RIEDEMAN.